United States Patent [19]

Kusakabe et al.

[11] Patent Number: 4,505,123

[45] Date of Patent: Mar. 19, 1985

[54] ABSORPTION HEAT PUMP SYSTEM

[75] Inventors: Hiroyoshi Kusakabe; Hideo Ishiko; Takeshi Okumura; Masashi Izumi; Masahiro Furukawa, all of Oizumi, Japan

[73] Assignees: Sanyo Electric Co., Ltd., Osaka; Tokyo Sanyo Electric Co., Ltd., Gunma, both of Japan

[21] Appl. No.: 463,837

[22] Filed: Feb. 4, 1983

[51] Int. Cl.³ .......................................... F25B 15/00
[52] U.S. Cl. ........................................ 62/148; 62/476
[58] Field of Search ............... 62/141, 146, 148, 476, 62/216

[56] References Cited

U.S. PATENT DOCUMENTS

| 3,314,246 | 4/1967 | Hopkins et al. | 62/148 X |
| 3,374,642 | 3/1968 | McMinn | 62/216 X |
| 4,290,273 | 9/1981 | Meckler | 62/148 |

Primary Examiner—Lloyd L. King
Attorney, Agent, or Firm—Hubbell, Cohen, Stiefel & Gross

[57] ABSTRACT

An absorption heat pump system having a generator, a condenser, an evaporator and an absorber connected hermetically to form closed cycles for a refrigerant and an absorbent, comprising a control means disposed in the refrigerant passage leading from said condenser to said evaporator and adapted to continuously controlling the temperature or flow rate of the liquid refrigerant, thereby to stabilize the temperature in said evaporator.

17 Claims, 10 Drawing Figures

ABSORPTION HEAT PUMP SYSTEM

BACKGROUND OF THE INVENTION

The present invention relates to an absorption heat pump system.

Generally, a refrigeration cycle has a heat absorption side and a heat radiation side. When the heat absorption side is utilized, the system serves as a refrigerator, whereas, when the heat radiation side is utilized, the system serves as a heat pump. All heat pumps follow this concept regardless of whether they are of compression type or absorption type.

The absorption heat pump system of the invention, however, is an absorption type system workable only as a heat pump and, hence, is not the same as that of the above-mentioned concept. More specifically, the invention is concerned with an absorption heat pump system in which a refrigerant is evaporated by heat utilizable at a low temperature level and a warmed water of a comparatively high temperature is produced by the heat of absorption which is generated when the vapor of the refrigerant is absorbed by an absorbent, i.e., the type in which the evaporation temperature and the vapor pressure of the refrigerant in the evaporator are higher than the condensation temperature and the vapor pressure of the refrigerant in the condenser and the absorption temperature of the refrigerant is higher than the temperature at which the refrigerant is generated.

FIG. 1 shows a basic arrangement of the absorption heat pump of the kind described. As will be seen from this Figure, the absorption heat pump has an evaporator 1 and an absorber 2 accommodated by an upper section constituting the high-pressure side and a generator 3 and a condenser 4 accommodated by a lower section which constitutes the low-pressure side. These constituents are connected hermetically through a refrigerant line 6 having a first refrigerant pump 5, a refrigerant line 8 having a second refrigerant pump 7, a concentrated solution line 10 having a solution pump 9, a U-shaped dilute solution line 11 and a solution heat exchanger 12 so as to constitute an absorption heat pump cycle. Heating medium tubes 13 and 14 are provided in the evaporator 1 and the generator 3, respectively, while the condenser 4 and the absorber 2 are provided with cooling water tubes 15 and heated water tubes 16, respectively.

In the absorber 2, heat of a temperature level higher than the heating medium ciculated through the heat medium tubes 13 is produced by the energy possesed by the refrigerant gas evaporated by the heat derived from the heat medium tubes 13 and also by the reaction heat which is generated when the refrigerant gas is absorbed by the solution. According to this arrangement, therefore, it is possible to obtain warmed water or vapor of water of a temperature level higher than the low-temperature heat source is obtained in a heat exchanger 16' of the absorber 2, and to supply the warm water or the water vapor to the load 19. This system will be referred to as "hot fluid production type absorption heat pump system".

For instance, by the use of lithium bromide as the absorbent and water as the refrigerant, while using waste steam of 98° C. as the low-temperature heat source and circulating cooling water of about 25° C. through the condenser, it is possible to obtain water vapor of about 130° C. from the heat exchanger 16' of the absorber 2.

In the described operation of the absorption heat pump system, the steady supply of the warm water or water vapor of constant temperature is achievable only under an ideal condition of operation. Namely, any fluctuation in the rate of supply of the evaporated refrigerant flowing from the evaporator 1 into the absorber 2 or in the refrigerant temperature tends to appear as a large fluctuation in the amount of heat energy supplied to the load 19. For instance, assuming that a heat pump system exhibits a thermal output fluctuation as shown in FIG. 2, this heat pump system is considered as having a capacity smaller than the average value M of the thermal output fluctuation, rather than the average value M, from the view point of heat capacity demanded by the load 19. This means that the efficiency of operation of the heat pump system is extremly low.

More practically, referring to FIG. 2 in which the vertical axis represents the output temperature and the horizontal axis represents the time, all of the thermal output at temperature levels below that is demanded by the load 19 cannot be used practically, unless the output temperature is raised by a suitable auxiliary heater which is not shown. In such a case, the heat pump system is materially unable to supply the heat to the load over most part of the operation period, i.e. the apparent output is drastically lowered, because of the fluctuation in the heating capacity even though the system inherently has sufficiently large heating capacity.

In connection with the described basic arrangement of the absorption heat pump system, it has been obliged to make an on-off control of the operation of the second refrigerant pump 7 in accordance with a signal derived from a level detector disposed in a refrigerant reservoir disposed at the lower side of the condenser 4. Moreover, in the absorption heat pump system, there is a tendency that a cavitation of the second refrigerant pump 7 takes place because of lowering of the liquid level in the liquid refrigerant reservoir attributable to a reduction in the amount of the condensed refrigerant in the condenser 4 as a result of a reduction in the rate of generation of the refrigerant vapor in the generator 3 which in turn takes place when the rate of energy supplied by the heat source is decreased, i.e. when there is a reduction in the rate of supply or the temperature of the heat source fluid such as waste warm water or steam from factories or power plants, warm water heated by solar energy and so forth. In order to avoid the cavitation, such an on-off control of the second refrigerant pump 7 is conducted in accordance with the signal from a level detector for detecting the level of liquid refrigerant in the liquid refrigerant reservoir in such a manner that, when the liquid level has come down below a predetermined level, the second refrigerant pump 7 is stopped but the same is started again as the level of the liquid refrigerant has been increased beyond the predetermined level.

This conventionally adopted on-off control, however, imposes various problems. For instance, when the second refrigerant pump is started again, a large amount of condensate liquid refrigerant of low temperature is introduced from the condenser 4 to the evaporator 1 of high-pressure and temperature side, so that the pressure and temperature in the upper section are drastically lowered to inconveniently lower the temperature of the warm water supplied by the heat pump system. Namely, a so-called hunting of the output temperature inevitably takes place in response to the repeated starting and stopping of the second refrigerant pump 7.

In the conventional absorption heat pump system of the type described, the pressure differential between the upper section of high pressure and the lower section of low pressure is decreased as the temperature of the cooling water circulated through the condenser 4 is raised or as the heat input to the evaporator 1 is reduced, whereas the discharge pressure of the second refrigerant pump is not changed substantially. In consequence, the rate of supply of the liquid refrigerant from the condenser 4 to the evaporator 1 is increased to cause a drastic lowering of the liquid level in the liquid refrigerant reservoir 18. Since the on-off control of the second refrigerant pump 7 is conducted in response to this drastic change in the liquid level, the output temperature, i.e. the temperature of warm water produced in the system, is unstabilized. In addition, the efficiency of operation of the absorption heat pump system is decreased due to escape of the refrigerant liquid into a solution reservoir 20 below the absorber 2, partly because a rise in the liquid level in the unevaporated refrigerant reservoir 19 under the evaporator due to a decrease in the rate of evaporation of refrigerant caused by a reduction in the heat input to the evaporator 1, and partly because a large amount of condensate refrigerant liquid is introduced at once from the condenser 4 into the evaporator 1. As a result, the capacity of the system for supplying the warm water, i.e. the warm water output of the system, is further decreased.

Another problem in the hot fluid production type absorption heat pump system is that, when the temperature or flow rate of the liquid refrigerant introduced from the condenser to the evaporator is decreased, the rate of evaporation of the refrigerant is decreased as a result of lowering of the refrigerant temperature in the evaporator, because of the fact that the condensation temperature of the refrigerant in the condenser is lower than the evaporation temperature of the same in the evaporator.

As a countermeasure for obviating this problem, it is of course advisable to control directly the major factors, i.e. the temperature and flow rate of the heat source medium supplied to the evaporator and the generator.

In the heat pump system of the hot fluid production type, however, the waste heat fluid of a comparatively low temperature level, discharged from production equipments such as factories, chemical processes or the like is used as the heat source fluid supplied to the evaporator and generator. Under this circumstance, there is a practical limit in controlling the temperature and flow rate of the heat source fluid supplied to the evaporator and the generator, from the view point of the operation efficiency of the production equipment from which the heat source fluid is derived. The same problem, i.e. the difficulty in effecting direct control of the flow rate and temperature of the heat source fluid, is encountered also when a geo-thermal heating medium such as hot water or steam in springs is utilized as the heat source medium.

SUMMARY OF THE INVENTION

Accordingly, it is an object of the invention to provide a heat pump system of hot fluid production type, improved to permit a stable production of heated fluid at a constant rate and at a temperature above a predetermined temperature. Particularly, it is quite important that this object be achieved without necessitating any direct control of temperature or flow rate of the heat source fluid in the evaporator and the generator.

To this end, according to the invention, there is provided an absorption heat pump system having a generator, a condenser, an evaporator and an absorber connected hermetically to form closed cycles for a refrigerant and an absorbent, wherein a heat source fluid is circulated through the generator to separate the vapor of the refrigerant from the absorbent in the generator, and the vapor refrigerant from the generator is condensed and liquefied in the condenser by a cooling fluid circulated through the condenser, while the heat source fluid is circulated through the evaporator to evaporate the liquid refrigerant coming from the condenser to develop a higher temperature in the evaporator than in the condenser, whereby a heated fluid of a temperature level higher than that of the heat source fluid is obtained from the absorber by the heat which is produced when the vapor refrigerant coming from the evaporator is absorbed by the solution, characterized by comprising a control means disposed in the refrigerant passage leading from the condenser to the evaporator and adapted to continuously controlling the temperature or flow rate of the liquid refrigerant, thereby to stabilize the temperature in the evaporator.

Namely, according to the invention, the fluctuation of the temperature of liquid refrigerant in the evaporator is prevented by the control of temperature or flow rate of the liquid refrigerant flowing from the condenser to the evaporator so that the rate of evaporation of the refrigerant in the evaporator and, hence, the rate of absorption of the refrigerant by the absorbent in the absorber are stably maintained to ensure a stable production of the heated fluid at a temperature above the predetermined temperature in the absorber.

DESCRIPTION OF THE PREFERRED EMBODIMENTS

Figure 1:
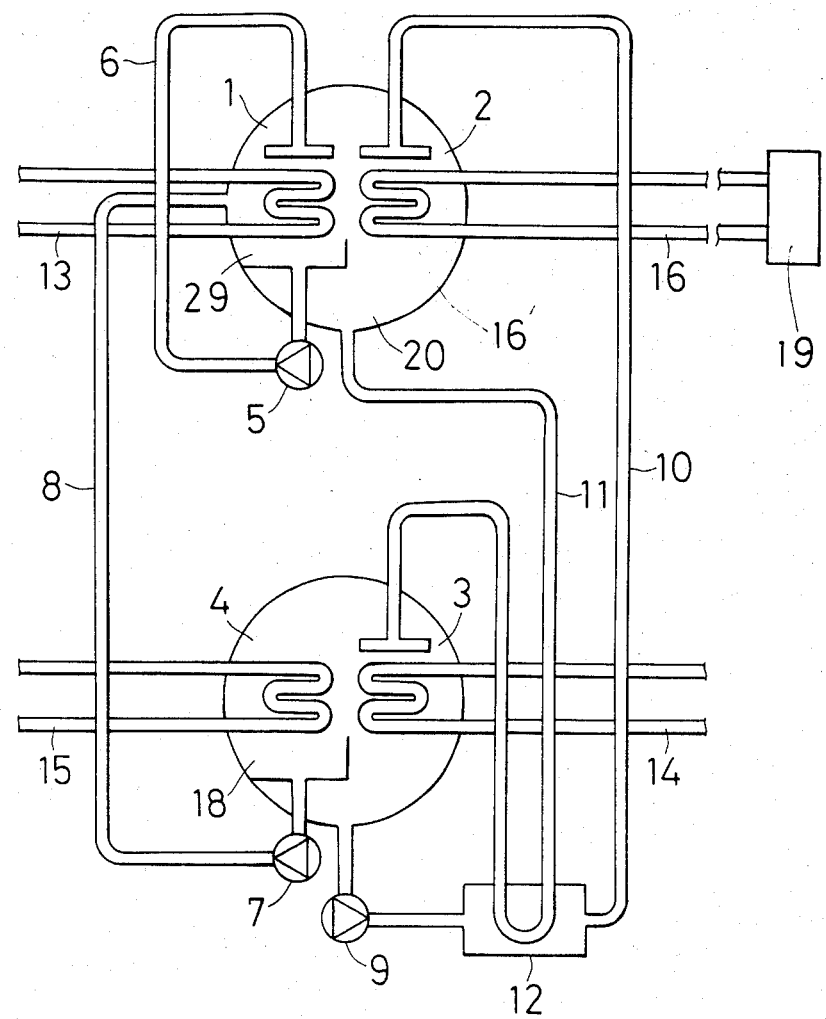
FIG. 1 is a schematic illustration of the basic arrangement of an absorption heat pump system of the hot fluid production type.

The invention will be fully described hereinunder with specific reference to the accompanying drawings showing some preferred embodiments of the invention. Throughout the Figures showing the embodiments of the invention, the same or like reference numerals are used to denote the same or like parts as those in the basic arrangement explained before.

Figure 3:
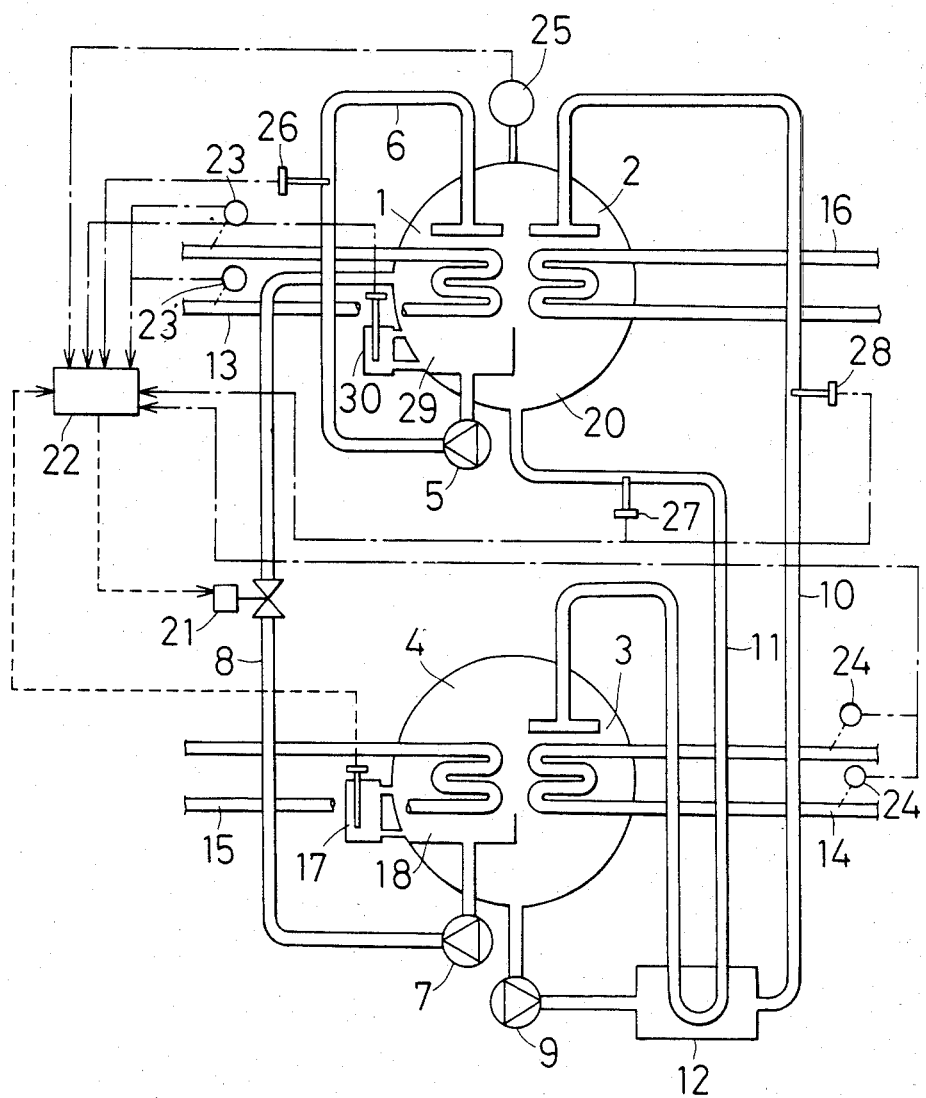
FIG. 3 is an illustration of the basic circuit arrangement of an absorption heat pump system in accordance with an embodiment of the invention.

(1) FIG. 3 shows a preferred embodiment of the invention in which an evaporator 1 and an absorber 2 are formed in the upper section of high pressure while a generator 3 and a condenser 4 are formed in the lower section of low pressure. These constituents are connected by the refrigerant line 8, solution lines 10,11 and so forth to form an absorption heat pump cycle so as to deliver warm water of a temperature above a predetermined temperature from the warm water discharge tubes 16, as in the case of the basic arrangement explained before in connection with FIG. 1. A refrigerant control valve 21 is disposed in the refrigerant line 8 through which the condensate liquid refrigerant is introduced from the liquid refrigerant reservoir 18 under the condenser 4 in the lower section to the evaporator 1 formed in the upper section of the high pressure. A level detector 17 for detecting the level of the condensate liquid refrigerant in the liquid refrigerant reservoir 18. The arrangement is such that the opening degree of the refrigerant control valve 21 is controlled in accordance with the signal from the level detector 17, through the operation of a control circuit 22.

If the heat energy of the heat source fluid supplied to the generator 3 and/or the evaporator 1 is decreased, i.e. if the heat input to the absorption heat pump system or the cooling power supplied to the condenser 4 is decreased, the level of the liquid refrigerant in the liquid refrigerant reservoir 18 starts to come down. Upon detection of the lowering of the level of liquid refrigerant by the level detector 17, the opening degree of the refrigerant control valve 21 is decreased so that the flow rate of the refrigerant from the condenser 4 to the evaporator 1 is decreased. It is thus possible to avoid any abrupt reduction of the liquid level in the condensate liquid refrigerant reservoir 18, while eliminating unfavourable phenomena such as cavitation of the second refrigerant pump 7 and the invasion of the solution reservoir 20 by the liquid refrigerant, thereby to ensure a safe and stable operation of the absorption heat pump system.

To the contrary, as the heat input and/or the cooling power applied to the system is increased, the level of the liquid refrigerant in the condensate liquid refrigerant reservoir 18 starts to rise. The rise of the liquid level is detected by the level detector 17 and the opening degree of the refrigerant control valve 21 is increased in accordance with the signal from the level detector thereby to increase the rate of flow of the refrigerant from the condenser 4 to the evaporator 1.

In the described embodiment, the absorption heat pump system has a detection mechanism, i.e. the detector 17 for detecting the level of the condensate liquid refrigerant level detector, capable of detecting the level of the condensate liquid refrigerant which varies in accordance with a change in the heat energy supplied to the generator 3 and/or the evaporator 1, i.e. the heat input or the cooling power applied to the system, and a control mechanism, i.e. the refrigerant control valve 21, adapted to control the rate of supply of the refrigerant from the condenser 4 to the evaporator 1 in response to the signal derived from the detection mechanism. The liquid level detection mechanism and the control mechanism cooperate with each other in controlling the rate of supply of the refrigerant to the evaporator 1 linearly or in a stepped manner in proportion to a change in the level of the liquid refrigerant. In the absorption heat pump system of the described embodiment, therefore, it is possible to prevent the undesirable hunting of the output water temperature, which unavoidably takes place in the conventional heat pump system of the kind described in response to frequent starting and stopping of the second refrigerant pump 7, is avoided to ensure the supply of stable temperature of the warmed water produced in the system.

Figure 5:
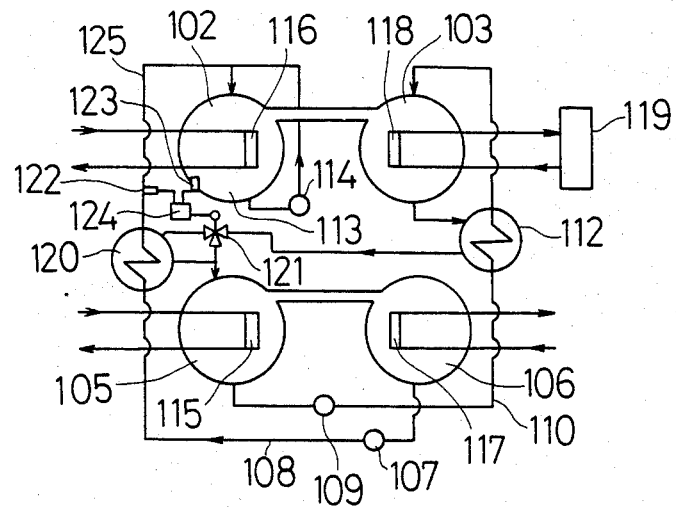
FIG. 5 is a diagram showing an absorption refrigeration cycle incorporated in an absorption heat pump system in accordance with still another embodiment of the invention.

Insteady of using the level detector 17 in FIG. 5 for detecting the level of the condensate liquid refrigerant, it is possible to use, as the detection mechanism mentioned before, temperature detectors 23 and 24 or flow-rate detectors 23' and 24' in the heat source medium supply tubes 13 and 14 as indicated by on-dot-and-dash lines. Alternatively, it is possible to use a cooling water temperature detector in combination with a cooling water flow rate detector although these detectors are omitted from the drawings. Such detection mechanisms are superior to that of the described embodiment consisting solely of the level detector 17, in that they permit direct and prompt detection of the fluctuation in the heat energy supplied to the generator 3 and/or the evaporator 1, i.e. a fluctuation in the heat input or the cooling power applied to the absorption heat pump system. The detection mechanism used in the described embodiment, i.e. the level detector 17, is superior to other mechanisms such as the temperature detectors 23 and 24 in that it permits a direct and prompt detection and control of the flow rate of the refrigerant flowing from the condenser 4 to the evaporator 1. The detection mechanism need not always be such one as to adapted to detect the temperature of the heat source fluid or the level of the condensate liquid refrigerant but may be such one as adapted to detect any change in the physical amount caused by a change in the heat input to the absorption heat pump system or the cooling power applied to the applied to the same. For instance, a change in the heat input to the absorption heat pump system causes a change in the rate of generation of the vapor refrigerant in the generator 3 and rate of evaporation of the refrigerant in the evaporator 1 which in turn cause changes in vapor pressures in the upper and lower sections of the system, as well as a change in the evaporation temperature of the refrigerant sprayed in the evaporator 1 and a change in the temperature of the concentrated solution regenerated in the generator 3. The temperature of the unevaporated refrigerant sprayed in the evaporator 1 is also changed which in turn changes the temperature and flow rate of the dilute solution. It is, therefore, possible to use, as the detection mechanism, a pressure detector 25 for detecting the vapor pressure in the evaporator 1 and the absorber 2, i.e. the pressure in the upper section, a temperature detector 26 for detecting the temperature of the refrigerant sprayed in the evaporator 1, a temperature or flow rate detector 27 for the dilute solution, or a detector 28 for detecting the concentrated solution. When the physical amount detected by such a detector is increased or decreased in accordance with a change in the heat input to the absorption heat pump system or the cooling power applied to the same, the detector produces a signal which serves to decrease or increase the opening degree of the refrigerant control valve 21 through the action of the control circuit 22. It is also possible to use, as the detection mechanism, a level detector 30 for detecting the level of the unevaporated refrigerant in the unevaporated refrigerant reservoir 29. In such a case, the opening degree of the refrigerant control valve 21 is decreased or increased in accordance with a raising or lowering of the level of the unsaturated refrigerant.

Figure 4:
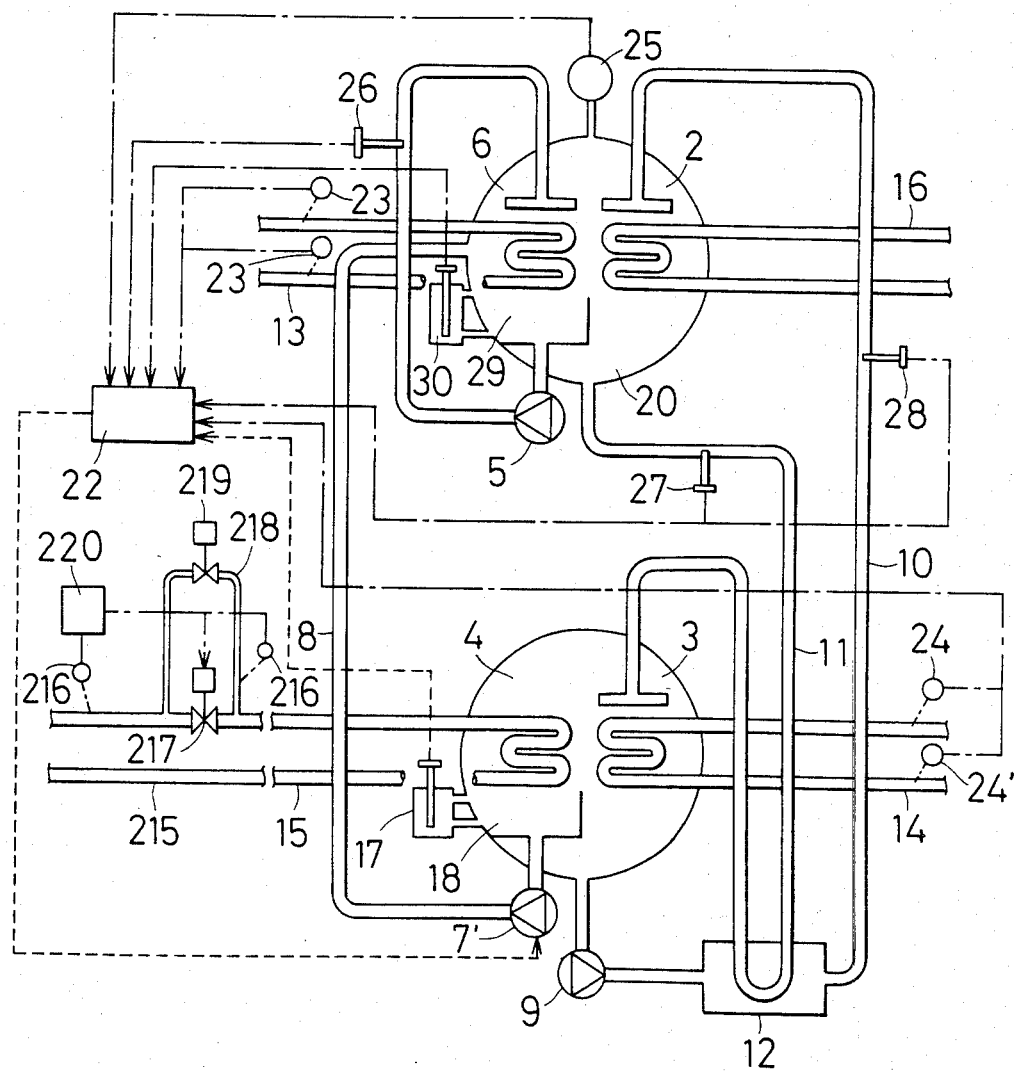
FIG. 4 is a view similar to that in FIG. 3, showing the circuit arrangement of an absorption heat pump system in accordance with another embodiment of the invention.

FIG. 4 shows another embodiment of the invention in which, as the means for controlling the rate of conveyance of heat from the condenser 4 to the evaporator 1, i.e. the flow rate or temperature of the refrigerant, a variable speed refrigerant pump 7' is disposed in the refrigerant line 8 to work in place of the refrigerant control valve 21.

The speed of the variable speed refrigerant pump 7' is controlled through the operation of the control circuit 22, in accordance with a signal derived from the detection mechanism which may be any one of the detectors mentioned before, i.e. the condensate liquid refrigerant level detector 17, heat source temperature detectors 23,24, heat source flow rate detector 23',24', detector 25 for detecting the pressure in the upper section, a refrigerant temperature detector 26, thin solution temperature detector or dilute solution flow rate detector 27, concentrated solution temperature detector 28 or the unevaporated refrigerant level detector 30, thereby to control the flow rate of the condensate liquid refrigerant in response to the change in the heat input to the absorption heat pump system.

As has been described, the absorption heat pump systems of the present invention explained hereinbefore in connection with FIGS. 3 and 4 are adapted to evaporate a refrigerant by the heat derived from a heat source of a low temperature level and hot water of high temperature is generated by the heat which is discharged when the vapor refrigerant is absorbed by the concentrated solution. Each of these systems has a detection mechanism for detecting a change in a physical amount attributable to the change in the heat input to the absorption heat pump system or the cooling power applied to the same, and a control mechanism for controlling the flow rate of the refrigerant from the condenser to the evaporator in response to the signal delivered by the detection mechanism. It is, therefore, possible to avoid the hunting of the output warm water temperature, which inevitably takes place in the conventional system in response to the frequent starting and stopping of the refrigerant pump, thereby to ensure a high stability of the output warm water temperature. It is to be noted also that the reduction in the operation efficiency of the system, attributable to the mixing of the refrigerant in the solution, is eliminated advantageously.

(2) FIG. 5 shows still another embodiment in which the upper part including the evaporator and the absorber and the lower part including the condenser and the generator are constructed in separate bodies, unlike the embodiments explained in connection with FIGS. 3 and 4 in which the upper and lower parts are constructed in one body.

The absorption heat pump system of the embodiment shown in FIG. 5 has a generator 105, condenser 106, evaporator 102, absorber 103, and a heat exchanger 112 in which the absorbent returned from the absorber 103 to the generator 105 heats the absorbent of low temperature which flows from the generator 105 to the absorber 103. The absorbent coming out of the heat exchanger 112 is introduced to a heater 120 to heat the liquid refrigerant which is supplied from the condenser 106 to the evaporator 102. A control valve 121 is adapted to control the flow rate of the absorbent introduced to the heater 120 upon comparing the temperature of the liquid refrigerant coming out of the heater 120 and the temperature of the refrigerant in a liquid refrigerant reservoir 113 attached to the evaporator, in such a manner that the liquid refrigerant is maintained substantially at the same level as the temperature in the evaporator 102.

Figure 2:
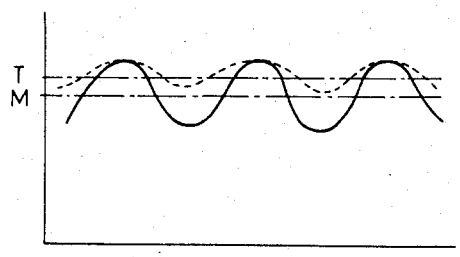
FIG. 2 is an illustration of expected fluctuation of heat output from the absorption heat pump system shown in FIG. 1.

By raising the temperature of the refrigerant just flowing into the evaporator 102 to a level approximating the temperature in the evaporator 102, the degree of change in the evaporating condition in the evaporator 102 caused by the refrigerant flowing into the evaporator 102 through a pipe 125 is decreased. The fluctuation of the output (amount of heat output or temperature attained) shown in FIG. 2 is increased as the temperature of the refrigerant coming into the evaporator approaches the predetermined temperature of the evaporator, i.e. the evaporator temperature in rated operation, so that the level of the minimum output point is raised to raise the apparent output of the absorption heat pump system correspondingly, as will be seen from broken-line curve in FIG. 2.

Namely, also in the absorption heat pump system of the type described, the rate of evaporation of the refrigerant in the evaporator 102, as well as the rate of generation of the refrigerant in the generator 105, is limited in accordance with a reduction in the level of the load, because in this absorption heat pump system the capacities of the pumps 107, 109, 114, heat feeders 115, 116, heat exchangers 117, 118 and so forth are designed in conformity with the maximum load condition. Therefore, if the rate of discharge from the pump 107 is not changed substantially, the average rate of circulation of the refrigerant through the system is decreased by the discontinuous operation of the pump. The temperature of the liquid refrigerant in the condenser 106, however, is considerably low as compared with the temperature of the liquid refrigerant circulated through the evaporator 102 by the pump 114, so that the temperature in the evaporator 102 and, hence, the rate of evaporation of the refrigerant in the evaporator 102, are drastically changed as the supply of the liquid refrigerant to the evaporator 102 is made or interrupted due to repeated starting and stopping of the pump 107, resulting in a large fluctuation in the heat generation in the absorber 103 or the output of the absorption heat pump system as a whole, i.e. the temperature of the warm water or steam outputted from the system or the amount of heat derived from the system per unit time to seriously deteriorate the operation efficiency of the absorption heat pump system. This problem, however, is suppressed or obviated in the absorption heat pump system of this embodiment in which the refrigerant which is to be supplied to the evaporator 102 is pre-heated to a temperature of a level approximating that in the evaporator 102, before it enters the evaporator. In addition, it is to be noted that, since the absorbent circulated through the absorption heat pump system is used as the heat source for heating the refrigerant, it is possible to use the heating energy at any desired time, and the amount of heat consumed in the heating can be suitably controlled by equipment for controlling the operation of the heat pump. Therefore, no substantial loss of energy takes place even if the energy input control for heating the refrigerant is made in a simplified manner.

Figure 6:
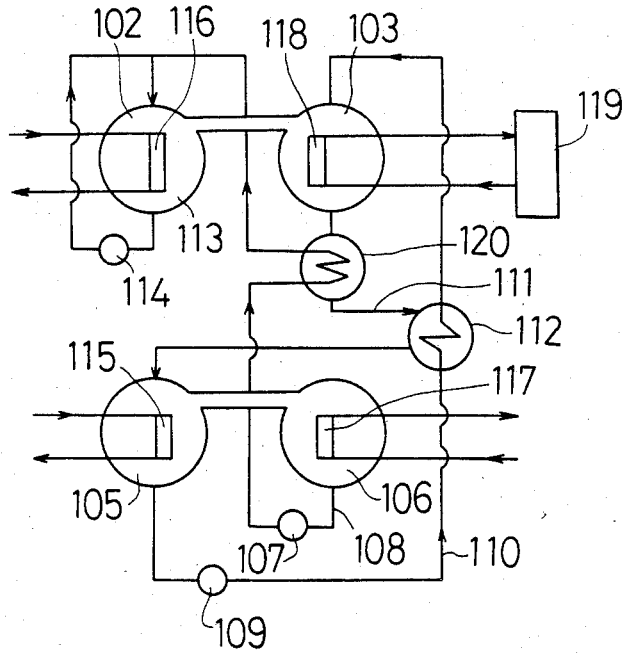
FIGS. 6 and 7 are diagrams similar to that shown in FIG. 5, but showing further embodiments of the invention.
Figure 10:
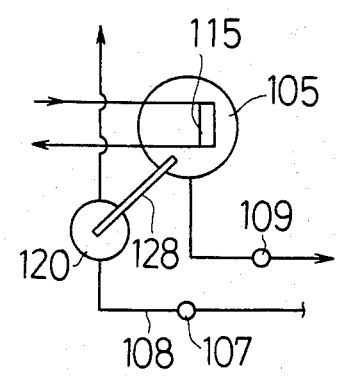

FIGS. 6 and 10 schematically show arrangements for heating the refrigerant in connection with the closed cycle of absorbent in heat pump systems in accordance with different embodiments of the invention.

Figure 7:
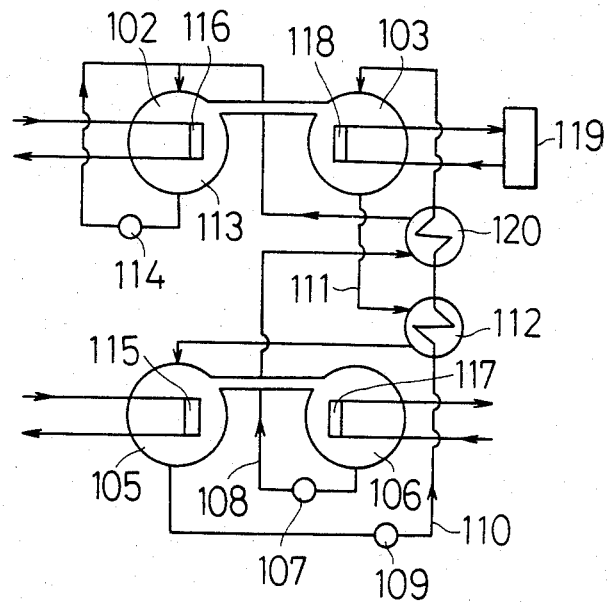
Figure 8:
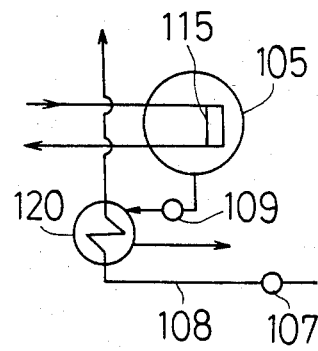
FIGS. 8 to 10 are schematic illustrations of refrigerant heating sections in still further embodiments of the invention.
Figure 9:
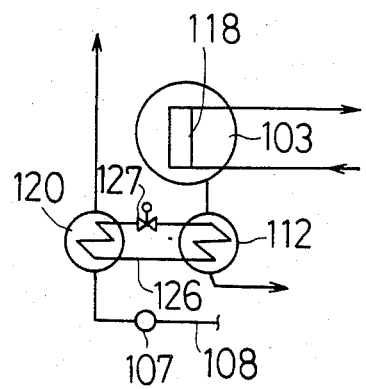

In the embodiment shown in FIG. 6, the heat exchanger 120 is so arranged as to effect a heat exchange between the dilute absorbent flowing from the absorber 103 to the heat exchanger 112 and the refrigerant. In this embodiment, it is possible to attain, with a heater of a reduced size, a substantially equivalent effect to that achieved by the heater shown in FIG. 5, because the greater temperature difference is available than in the embodiment shown in FIG. 5. FIGS. 7 and 8 in combination show an embodiment in which a heater 120 is provided in connection with the concentrated absorbent flowing from the generator 105 into the absorber 103, while FIG. 9 shows an embodiment in which heat is supplied to the refrigerant heater 120 by means of a circulation heating pipe 126 in which a heat medium such as freon is confined. A reference numeral 127 designates a control valve for controlling the heating rate through the control of the heating medium. Finally, FIG. 10 shows an embodiment in which heat is delivered to the refrigerant heater 120 by means of a heat pipe 128. All of the embodiments shown in FIGS. 6 through 10 achieve the same effect as that performed by the absorption heat pump system shown in FIG. 5.

In FIG. 4, a reference numeral 216 designates a temperature detector disposed in the cooling water pipe 215 at the cooling water outlet side of the condenser 204. The opening degree of the control valve 217 provided in the cooling water pipe 215 is controlled in accordance with the signal from the detector thereby to control the flow rate of the cooling water. It is also possible to use a by-pass pipe 218 connected to the cooling water pipe 215 and by-passing the control valve 217 for controlling the flow rate of the cooling water. In this case, an electromagnetic stop valve 219 is provided in the by-pass pipe 218.

In operation, as the cooling water temperature comes down due to a change in the ambient air temperature or the like reason, the temperature detector 216 produces a signal for decreasing the opening of the cooling water flow rate control valve 217 thereby to decrease the flow rate of the cooling water, so that the predetermined cooling water temperature is recovered in the condenser 4. To the contrary, as the cooling water temperature starts to rise, the opening degree of the cooling water flow rate control valve 217 is increased to lower the cooling water temperature to the predetermined level immediately.

According to this arrangement, it is possible to stably maintain the optimum pressure in the lower section of the system to ensure a stable balance of the force for circulating the solution. It is thus possible to stably obtain the warm water from the absorption heat pump system, overcoming the problems of the prior art.

In the event that the temperature of the cooling water circulated through the condenser 4 is lowered far from the predetermined set temperature due to, for example, a large drop of the ambient air temperature as in the winter season, the control valve 217 for controlling the flow rate of the cooling water is fully closed to prevent excessive lowering of the pressure in the lower section of the system. In such a case, the control is made while observing and detecting the rise of temperature in the cooling water by-pass pipe 218, in such a manner that the control valve 217 starts to open as the cooling water temperature is raised to the predetermined level. From a view point of design, a pipe of a suitable small diameter is used as the material of the cooling water by-pass pipe 218.

By providing the cooling water by-pass pipe 218 in the manner described, it is possible to detect the cooling water temperature and to stably control the pressure in the lower section of the system, even if the cooling water flow rate control valve 217 is kept fully closed. The temperature detector 216 may be provided in the cooling water by-pass pipe 218.

What is claimed is:

1. An absorption heat pump system which uses a heating medium to evaporate a refrigerant and supplies heat to a load at a higher temperature than that of the heating medium employed, comprising:

a generator for generating a gaseous refrigerant from an absorption solution, a condenser in functional relationship with the generator for condensing the gaseous refrigerant into liquid form, an evaporator for evaporating the refrigerant, a refrigerant passage connecting the condenser to the evaporator, an absorber in functional relationship with the evaporator for absorbing gaseous refrigerant from the evaporator, a concentrated solution passage connecting the generator to the absorber for passing the absorption solution from the generator to the absorber, a dilute solution passage connecting the absorber to the generator for passing the refrigerant and absorption solution from the absorber to the generator, and control means in the refrigerant passage for controlling the flow rate of the liquid refrigerant for stabilizing the temperature in the evaporator, said control means being a proportional controller for effecting a proportional control of the flow rate of said refrigerant flowing from said condenser to said evaporator in response to the amount of liquid refrigerant in said condenser.

2. The system according to claim 1, wherein said refrigerant is water and said absorption solution is lithium bromide.

3. The system according to claim 1, wherein said control means further comprises a detector for detecting the amount of liquid refrigerant in said condenser, a refrigerant flow rate control valve disposed in the refrigerant passage, and a control circuit for generating a signal proportional to the amount of liquid refrigerant detected by said detector and for delivering to said control valve said signal for controlling the degree of valve opening in response to said signal.

4. The system according to claim 1, wherein said control means further comprises a detector for detecting the amount of liquid refrigerant in said condenser, a variable speed pump disposed in the refrigerant passage and a control circuit for generating a signal proportional to the amount of liquid refrigerant detected by said detector and for delivering to said refrigerant pump said signal for controlling the speed of said pump.

5. An absorption heat pump system which uses a heating medium to evaporate a refrigerant and supplies heat to a load at a higher temperature than that of the heating medium employed, comprising:

a generator for generating a gaseous refrigerant from an absorption solution, a condenser in functional relationship with the generator for condensing the gaseous refrigerant into liquid form, an evaporator for evaporating the refrigerant, a refrigerant passage connecting the condenser to the evaporator, an absorber in functional relationship with the evaporator for absorbing gaseous refrigerant from the evaporator, a concentrated solution passage connecting the generator to the absorber for passing the absorption solution from the generator to the absorber, a dilute solution passage connecting the absorber to the generator for passing the refrigerant and absorption solution from the absorber to the generator, and control means in the refrigerant passage for controlling the temperature of the liquid refrigerant for stablizing the temperature in the evaporator.

6. The system according to claim 5, wherein said control means comprises a liquid refrigerant heater disposed in heat exchanging relation to the refrigerant passage between the condenser and the evaporator and having an absorbent circulation passage, said absorbent circulation passage comprising at least a part of the dilute solution passage.

7. A system according to claim 5, wherein said control means comprises a liquid refrigerant heater disposed in heat exchanging relation to the refrigerant passage between the condenser and the evaporator and having an absorbent circulation passage, said absorbent circulation passage comprising at least a part of the concentrated solution passage, and further comprising a heat exchanger wherein the concentrated solution passage and dilute solution passage are brought into heat exchanging relation with one another, and the absorbent circulation passage in the liquid refrigerant heater comprises a portion of the concentrated solution passage between the heat exchanger and the absorber.

8. A system according to claim 5, wherein said control means comprises a liquid refrigerant heater disposed in heat exchanging relation to the refrigerant passage between the condenser and the evaporator and having an absorbent circulation passage, said absorbent circulation passage comprising at least a part of the concentrated solution passage, and further comprising a heat exchanger, wherein the concentrated solution passage and dilute solution passage are brought into heat exchanging relation with one another, and the absorbent circulation passage in the liquid refrigerant heater comprises a portion of the concentrated solution passage between the heat exchanger and the generator.

9. The system according to claim 5, wherein said refrigerant is water and said absorption solution is lithium bromide.

10. A system according to claim 6, further comprising a heat exchanger wherein the concentrated solution passage and the dilute solution passage are arranged in a heat exchanging relation to one another, and wherein the absorbent circulation passage of said liquid refrigerant heater comprises a portion of the dilute solution passage between said heat exchanger and said absorber.

11. A system according to claim 6, wherein said liquid refrigerant heater comprises a circulation heating pipe disposed in heat exchanging relations to both passages and confining a heat medium therein.

12. A system according to claim 6, wherein said liquid refrigerant heater comprises a heat pipe arranged in a heat exchanging relations to both passages.

13. The system according to claim 3, wherein said detector is a level detector for detecting the level of the liquid refrigerant.

14. The system according to claim 4, wherein said detector for detecting the amount of liquid refrigerant is a level detector for detecting the level of the liquid refrigerant.

15. The system according to claim 6, further comprising a heat exchanger operatively connected to the concentrated solution passage and the dilute solution passage and wherein the absorbent circulation passage of said liquid refrigerant heater comprises the part of the dilute solution passage between said heat exchanger and said generator.

16. The system according to claim 15, further comprising means for measuring the difference in temperature between the refrigerant leaving said liquid refrigerant heater and the liquid refrigerant in said evaporator, and wherein the absorbent solution circulation passage further comprises a dilute solution passage flow rate control valve for controlling the flow rate in the dilute solution passage in accordance with said measured temperature difference.

17. An absorption heat pump system which uses a heating medium to evaporate a refrigerant and supplies heat to a load at a higher temperature than that of the heating medium employed, comprising:

a generator for generating a gaseous refrigerant from an absorption solution, a condenser in functional relationship with the generator for condensing the gaseous refrigerant into liquid form, an evaporator for evaporating the refrigerant, a refrigerant passage connecting the condenser to the evaporator, an absorber in functional relationship with the evaporator for absorbing gaseous refrigerant from the evaporator, a concentrated solution passage connecting the generator to the absorber for passing the absorption solution from the generator to the absorber, a dilute solution passage connecting the absorber to the generator for passing the refrigerant and absorption solution from the absorber to the generator, and control means in the refrigerant passage for controlling the flow rate of the liquid refrigerant for stabilizing the temperature in the evaporator, said control means being a proportional controller for effecting a proportional control of the flow rate of said refrigerant flowing from said condenser to said evaporator in response to any of the temperature of the heating medium, the temperature of the refrigerant entering the evaporator, the temperature of the absorption solution, or the vapor pressure of the absorber.

* * * * *

UNITED STATES PATENT AND TRADEMARK OFFICE
CERTIFICATE OF CORRECTION

PATENT NO. : 4,505,123
DATED : March 19, 1985
INVENTOR(S) : Kusakabe et al

It is certified that error appears in the above-identified patent and that said Letters Patent is hereby corrected as shown below:

On the title page Insert

-- (30) Foreign Application Priority Data

| | | |
|---|---|---|
| February 4, 1982 | Japan | 17278/1982 |
| February 12, 1982 | Japan | 21383/1982 --. |

Signed and Sealed this

Twenty-eighth Day of October, 1986

[SEAL]

Attest:

DONALD J. QUIGG

Attesting Officer

Commissioner of Patents and Trademarks